(12) United States Patent
Kharitonov et al.

(10) Patent No.: US 9,302,760 B2
(45) Date of Patent: Apr. 5, 2016

(54) DEVICE FOR ATTACHMENT OF DOORS OF AN AIRCRAFT

(75) Inventors: Sergey Nikolaevich Kharitonov, Moscow (RU); Andrey Alexandrovich Chernyavskiy, Moscow (RU)

(73) Assignee: AIRBUS S.A.S., Blagnac (FR)

( * ) Notice: Subject to any disclaimer, the term of this patent is extended or adjusted under 35 U.S.C. 154(b) by 0 days.

(21) Appl. No.: 14/232,227

(22) PCT Filed: Jul. 12, 2011

(86) PCT No.: PCT/RU2011/000512
§ 371 (c)(1),
(2), (4) Date: May 9, 2014

(87) PCT Pub. No.: WO2013/009209
PCT Pub. Date: Jan. 17, 2013

(65) Prior Publication Data
US 2014/0283455 A1  Sep. 25, 2014

(51) Int. Cl.
*B64C 1/14* (2006.01)
*B60J 5/00* (2006.01)
*E06B 3/988* (2006.01)

(52) U.S. Cl.
CPC ............... *B64C 1/1407* (2013.01); *B60J 5/00* (2013.01); *E06B 3/988* (2013.01)

(58) Field of Classification Search
CPC ........... B64C 1/1407; B60J 5/00; E06B 3/988
USPC ............. 49/381, 397; 16/382, 247; 244/129.5
See application file for complete search history.

(56) References Cited

U.S. PATENT DOCUMENTS

| | | | | |
|---|---|---|---|---|
| 3,263,368 A | * | 8/1966 | Hildum et al. | 49/382 |
| 4,761,852 A | * | 8/1988 | Sauber | 16/237 |
| 5,738,303 A | | 4/1998 | Hamatani et al. | |
| 2006/0202087 A1 | | 9/2006 | Mortland | |
| 2008/0099601 A1 | * | 5/2008 | Christman | 244/102 A |
| 2013/0067689 A1 | * | 3/2013 | Mitchell et al. | 16/382 |

FOREIGN PATENT DOCUMENTS

| | | | |
|---|---|---|---|
| DE | 2441829 A1 | 3/1976 | |
| DE | 3435161 A1 * | 4/1986 | ............... E05D 5/02 |
| EP | 0743246 A1 | 11/1996 | |
| RU | 2268842 C1 | 1/2006 | |
| RU | 2368725 C1 | 9/2009 | |

OTHER PUBLICATIONS

International Search Report issued in International Application No. PCT/RU2011/000512 on Mar. 23, 2012.

* cited by examiner

*Primary Examiner* — Jerry Redman
(74) *Attorney, Agent, or Firm* — Hauptman Ham, LLP

(57) ABSTRACT

A device for attachment of a door of an aircraft including a base bracket and a door-engaging fitting that bears the door. The base bracket has two flanges spaced longitudinally along the bracket, and a first flange is attachable to a frame surrounding the door, and the door-engaging fitting is attachable to an opposite, second, flange, the second flange being adapted to adjust a position of the door-engaging fitting, relative to, and in a plane parallel with, that second flange.

2 Claims, 3 Drawing Sheets

DEVICE FOR ATTACHMENT OF DOORS OF AN AIRCRAFT

RELATED APPLICATIONS

The present application is a U.S. National Phase entry of International Application No. PCT/RU2011/000512, filed Jul. 12, 2011.

FIELD OF THE INVENTION

This invention relates to the structure for attachment of the doors to a surface, preferably of an aircraft door.

BACKGROUND OF THE INVENTION

The door structure within cutout of the fuselage of an aircraft commonly consists of different groups of construction elements such as door fittings located on a door frame shell and also on the door itself These interface elements between the door and the door frame can be divided into two general groups with fixed and adjustable positions to meet all requirements for the door operation. As an example the FIG. 1 shows the structure for attachment of the doors conventionally used in an aircraft, In that a fixed plate (3) fastened to a door frame (1). The door engaging fitting (5) is joined to the frame (1) by bolts (6) through the fixed plate (3) and a loose plate (4) in cases when the loose plate is being used. The groups of holes (7) in all the parts have enlarged size relative to the bolts (6) diameter to enable a shift of the door engaging fitting (5) relative to the frame (1) and thus adjustment of the door position to meet all mechanical requirements of the door operation.

The currently used attachment structure as described above has a number of drawbacks.

First of all, the conventional structure produces obstacles to installation and fixing during the initial mounting, when elements of lining are already installed and during maintenance work, in replacement due to damage or deterioration which requires disassembling of the cabin lining located in the area of door cutout. Further difficulties are produced by the more complicated access to the attachment bolts (6) during assembly work due to limited area by the closely spaced elements of the structure such as: door stops, seal stricker and also the low height of the frame (1) which in addition impedes minimizing of a number of typical parts during design activity.

The second drawback is that local area of the frame (1) is substantially weakened by the two sets of holes, for the rivets (2), attaching the fixed plate (1), and for the bolts (6) and therefore requires to be reinforced

SUMMARY OF THE INVENTION

It is an object of the present invention to provide a structure of attachment members for aircraft doors free of the above drawbacks, or at least decreasing their impact.

The inventive concept behind this invention is on the one hand to move the place of attachment of the door engaging fitting away from the door frame member, and therefore facilitate its assembly, replacement and adjustment. On the other hand the concept permits to move the door engaging fitting away from the door frame member, to avoid a direct attachment of the door engaging fitting to the frame to minimize the influence on the local area of the frame.

The above summarized inventive concept is implemented by the introduction of a new element into the attachment structure—a base bracket, having two flanges spaced longitudinally—along the bracket. A first of the flanges is rigidly fastened to the frame of the door, and the door engaging fitting is fixed on a second flange, opposite to the first one and spaced apart from it, which is adjustable thereto. Applying the base bracket to the door fitting structure it is possible, first of all, to move away from the area of the fitting attachment due to the height of the bracket, and secondly to avoid the weakening (degeneration) of the areas of said door frame member due to the group of enlarged holes for attachment bolts.

In addition to the above stated advantages of the claimed structure, it is noteworthy that the size of the bolts (12) used for attaching the door engaging fitting to the base bracket is less than the size of the bolts (6) used in prior art, which permits weight reduction and cost reduction as a result of using less material. It also enables reduction of the quantity of unique parts of—common functionality for different doors of the aircraft. Other features and advantages of this invention will be clear to a person skilled in the art from the descriptions provided in the below described parts.

BRIEF DESCRIPTION OF THE DRAWINGS

Similar elements in both figures are denoted by the same reference numerals.

DETAILED DESCRIPTION OF ONE EMBODIMENT OF THE INVENTION

Figure 1:
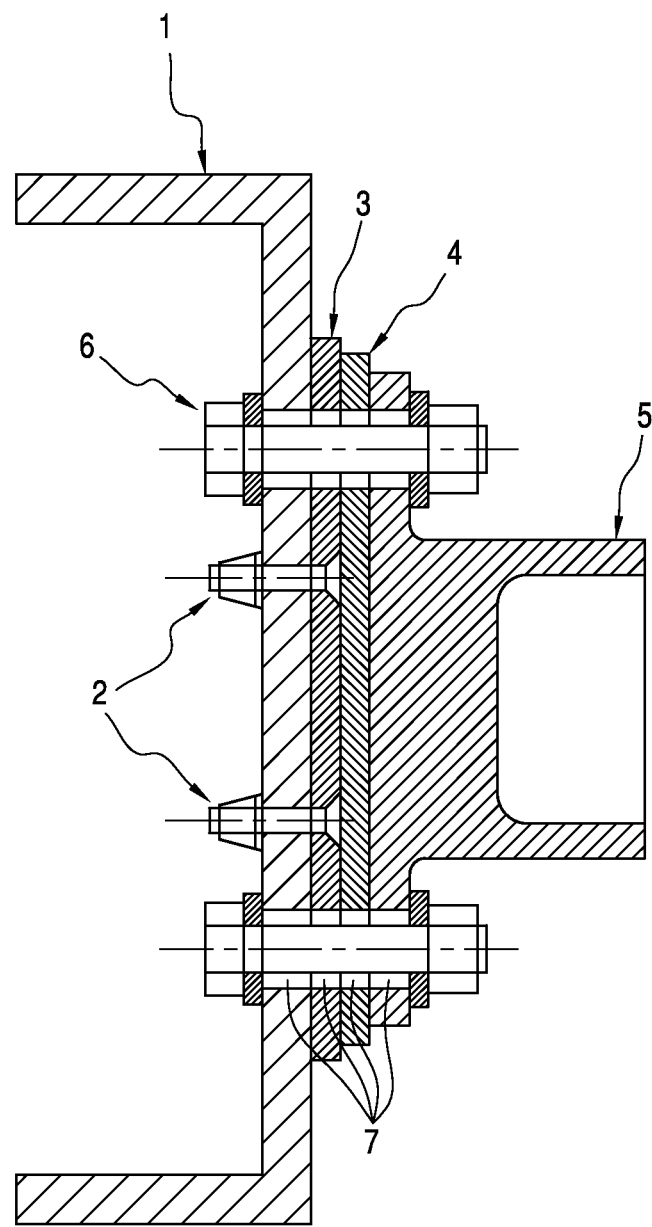
FIG. 1 is sectional view of the fitting currently used for the passenger cabin doors of an aircraft taken along line 1-1 in FIG. 3.
Figures 2, 2A:
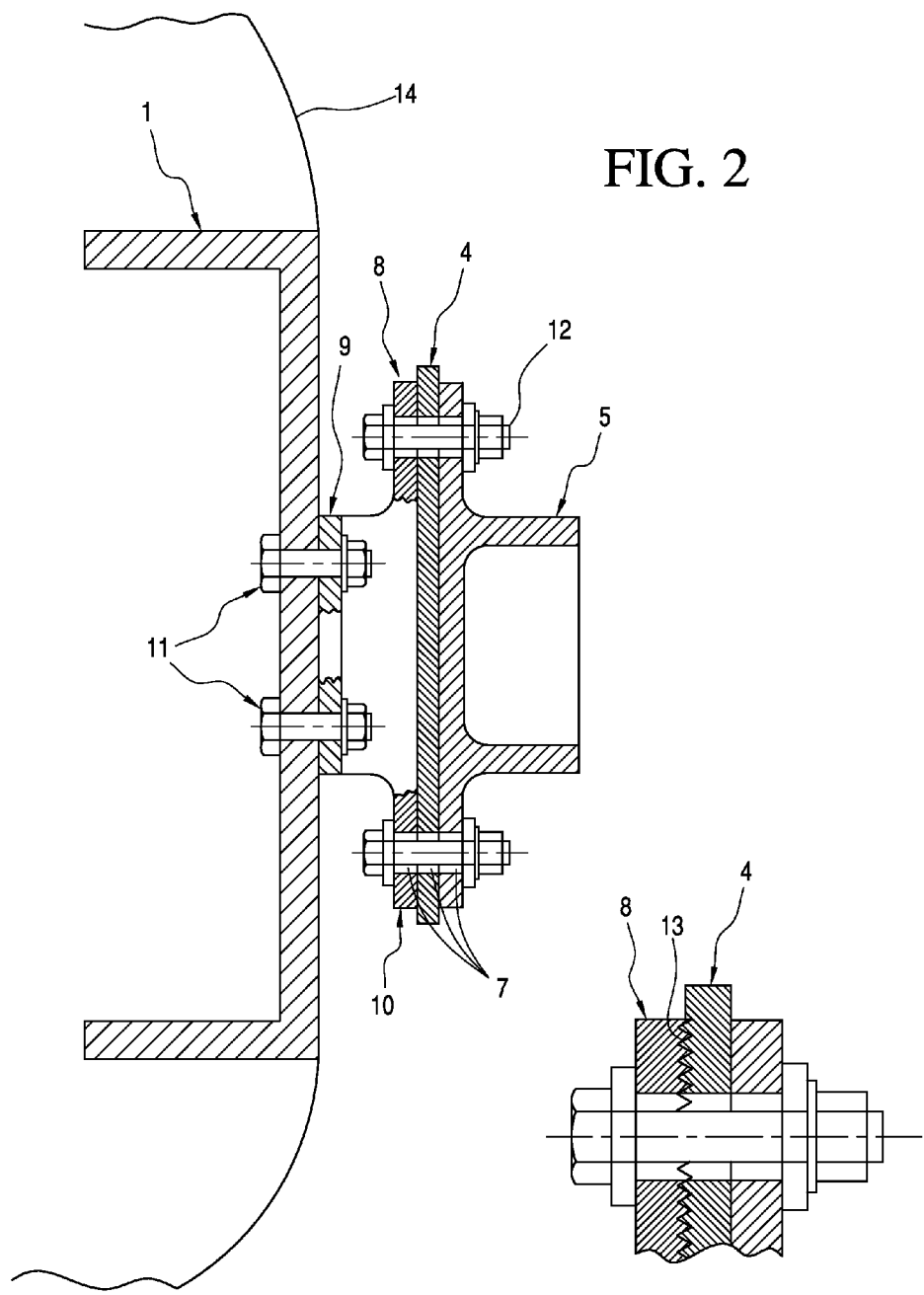
FIG. 2 is a sectional view of the fitting construction taken along line 2-2 in FIG. 4 according to one embodiment of the present invention.
FIG. 2a is an enlarged sectional view the intermediate plate and the base bracket having serrated faces.
Figure 3:
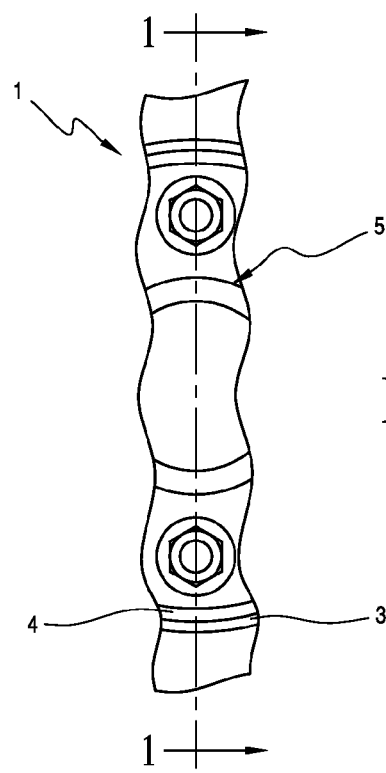
FIG. 3 is side view of an aircraft door frame with a fitting bolted thereon.
Figure 4:
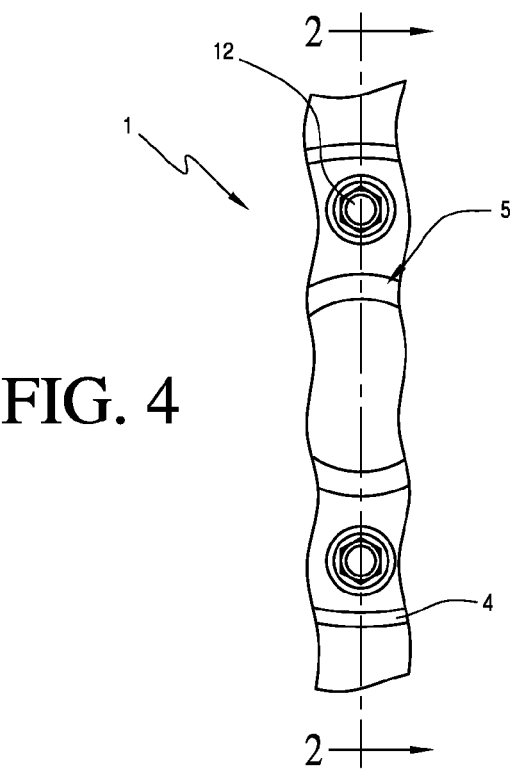
FIG. 4 is a side view of a fitting secured on an aircraft frame according one embodiment of the present invention.

FIG. 2 shows one embodiment of the invention, which constitutes a structure comprising a base bracket (8), an intermediate plate (4) and a bearing fitting (5). The base bracket (8) has two flanges (9, 10), spaced from each other within the height of the bracket (8). One of the flanges (9) is attached by the bots (11) to the frame (1) of the door surrounding, and the door engaging fitting (5) is attached to the other flange (10) by bolts (12) with the intermediate plate (4) interspersed there between. The holes (7) for the bolts (12) are larger than the diameter of the bolts, enabling relative movement of the intermediate plate (4) and the door engaging fitting (5) in relation to the flange (10) of the base bracket (8), i.e., the adjustment of the_position of the door engaging fitting for aligning the door.

Surfaces of the flange (10) and of the intermediate plate (4), facing each other, have notches, serrations which cog with each other in order to avoid displacement between the surfaces and flanges.

Presence of the intermediate plate (4) is not mandatory. In the event of its absence the said serrations are provided on contacting surfaces of the flange (10) and the bearing fitting (5).

FIG. 2 shows the door frame 1 of an aircraft 14. Alternatively, as shown in FIG. 2a, the contact faces of intermediate plate 4 and the base bracket 10 may include serrations 13.

Sequence of the attachment assembly shall be as follows. Initially, the base bracket (8) is attached to the door frame member by the bolts (11), and then, the door engaging fitting (5) is attached to the flange (10) of the base bracket (8) via the bolts (12) through the intermediate plate (4) or without the intermediate plate. Adjustment of the fitting position is implemented through loosening the bolts (12) enabling movement of the fitting relative to the flange (10) of the base bracket (8) with the spacing determined by the size of serration.

INDUSTRIAL APPLICABILITY

The invention can be applied in cases where door needs to be adjusted within door cutout.

The invention claimed is:

1. A device attached to a door of an aircraft, comprising: a base bracket and a door-engaging fitting that bears the aircraft door, wherein the base bracket has two flanges and a support member disposed therebetween, wherein the two flanges are spaced longitudinally apart along the bracket; a first flange is attached to an aircraft frame surrounding the door, and the door-engaging fitting is attached to an opposite, second, flange, wherein attachment of the door-engaging fitting to the second flange of the base bracket is executed through an intermediate plate with use of a bolted connection, wherein each hole has a bolt in the second flange of the base bracket, the intermediate plate and the door-engaging fitting, is larger in diameter than a bolt which adjusts the position of the door-engaging fitting, the intermediate plate, and the base bracket relative to one another in a plane parallel with the second flange.

2. The device of claim 1, wherein surfaces of the second flange of the base bracket and the intermediate plate, facing each other, are serrated.

* * * * *